Oct. 27, 1942.      E. MARTIN      2,300,233
PROPELLER BLADE MOUNTING
Filed Oct. 13, 1939
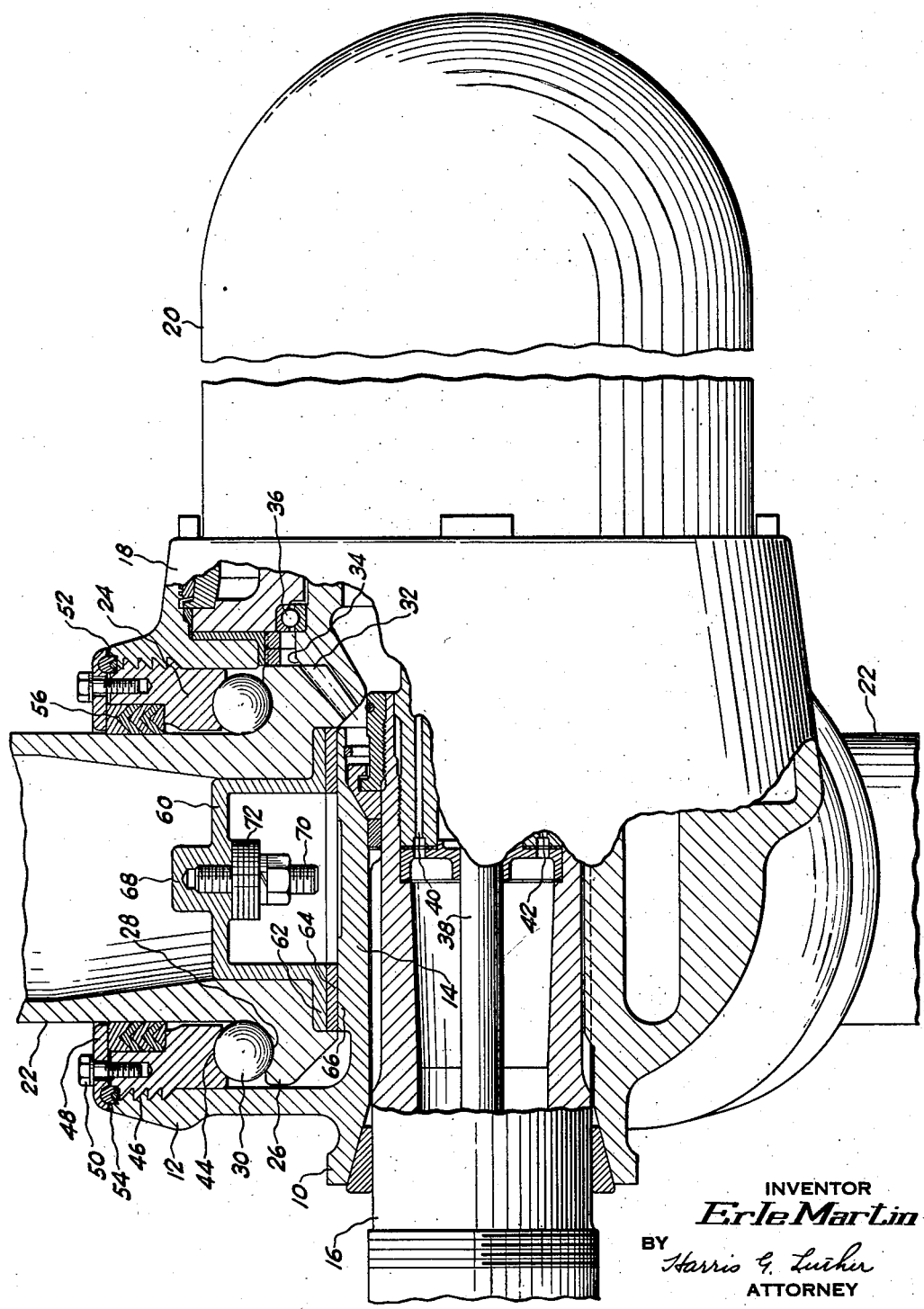
INVENTOR
*Erle Martin*
BY *Harris G. Luther*
ATTORNEY Patented Oct. 27, 1942

2,300,233

UNITED STATES PATENT OFFICE 2,300,233

PROPELLER BLADE MOUNTING

Erle Martin, West Hartford, Conn., assignor to United Aircraft Corporation, East Hartford, Conn., a corporation of Delaware Application October 13, 1939, Serial No. 299,275

3 Claims. (Cl. 170—163)

This invention relates to improvements in blade mountings for aeronautical propeller blades and has particular reference to an improved mounting for a hollow steel blade.

An object of the invention resides in the provision of an improved blade mounting including an anti-friction bearing in which the blade itself provides one of the bearing races.

A further object resides in the provision, in a blade mounting for a controllable-pitch propeller, of an anti-friction bearing in which the blade is formed to provide one of the bearing races and in which the blade portion providing the race also provided a gear sector for rotating the blade to change the propeller pitch.

A still further object resides in the provision of an improved blade mounting for rotatively securing a propeller blade and an integral propeller hub member in which the mounting includes an anti-friction bearing, one race of which is provided by the blade itself and the other race of which is provided by the blade retaining nut.

Other objects and advantages will be more particularly pointed out hereinafter or will become apparent as the description proceeds.

In the accompanying drawing, in which like reference numerals are used to designate similar parts throughout, there is shown an illustrative arrangement for the purpose of disclosing the invention. The drawing, however, is for illustrative purposes only and is not to be taken as limiting or restricting the scope of the invention since it will be apparent to those skilled in the art that various changes may be made in the illustrated construction without in any way exceeding the scope of the invention.

In the drawing, the single figure is an elevational view of the center portion of an aeronautical propeller constructed according to the invention, a portion being broken away and shown in sections to illustrate the construction thereof.

Referring to the drawing in detail, the numeral 10 generally indicates a propeller hub having integral blade receiving sockets 12 surrounding a cylindrical portion 14 which receives the propeller shaft 16, and provided with an annular flange 18 to which the open end of the enclosure 20 for the pitch changing mechanism is secured.

A propeller blade, as indicated at 22, is rotatably mounted in each socket 12 and is retained therein by means of a retaining nut, as indicated at 24.

The hollow blade 22 has a thickened base end extended into a radial flange 26 in the surface of which opposite the blade end there is provided an annular race 28 of arcuate cross section for the anti-friction ball elements 30. The nut 24 may be positioned surrounding the blade shaft before this flange is formed, in a manner well known to the art. The flange 26 is provided on the blade end of a portion thereof with gear teeth 32 which mesh with the teeth 34 of a rotatable gear element supported by suitable means, such as the anti-friction bearing 36, and rotated to change the pitch of the propeller by a suitable power actuated mechanism contained in the enclosure 20. The blade is preferably formed of a hard resilient metal, such as steel, and if desired, the race 28 and gear teeth 32 may be additionally hardened by some suitable process, such as the well known case hardening process, to render these parts especially resistant to wear. This mechanism may be hydraulically operated and connected with hydraulic fluid under pressure and with a drain line by suitable conduits such as are shown at 38, 40 and 42 in a manner well known to the art.

For a more detailed description of a suitable blade turning mechanism reference may be had to application Serial No. 184,792, filed January 13, 1938, by Erle Martin for Feathering propeller control.

The nut 24 is provided, in the annular surface thereof facing the flange 26, with a continuous groove of arcuate cross section 44 which provides the outer race for the ball elements 30. By this arrangement separate races for the anti-friction ball elements are entirely dispensed with, thereby providing an efficient construction of materially decreased weight.

The nut 24 is retained in the socket 12 by a series of buttress threads 46 each of which has one face in a plane perpendicular to the longitudinal axis of the propeller blade and the other inclined at an angle such as to provide sufficient strength for the threads. The nut is locked in place by means of the lock plate 48 secured to the outer end of the nut by suitable means, such as the cap screws 50 and held against rotation by the teeth or serrations 52 in the outer portion of its outer surface which engage with similar teeth provided on the end surface of the socket 12.

A seal 54 prevents leakage of hydraulic fluid through the threads 46 and an additional seal 56 compressed by the inner portion of the plate 48 prevents leakage between the nut and the propeller blade.

The end of the hollow blade may be closed by a cup shaped member 60 having at its open end an annular flange 62 which is received in a recess provided in the end of the blade 22 and which bears upon the outer surface of a thrust washer 64, the inner surface of which bears upon a bearing area 66 provided on the cylindrical portion 14 of the hub within the socket 12, to provide a footing for the blade and prevents it from wobbling in the socket. This cup member may have in its closed end a boss 68 provided with a screw threaded aperture into which is threaded one end of the bolt 70, which carries a series of blade balancing washers 72. This cup assists in maintaining the balance of the propeller by preventing oil used to lubricate the gears 32 and 34 from entering the hollow blade where it would not only increase the weight of the propeller but would also, in all probability, upset the propeller balance.

While a particular mechanical construction has been hereinabove described and illustrated in the accompanying drawing for the purpose of disclosing the invention, it is to be understood that the invention is not limited to the particular form so illustrated and described, but that such changes in the size, shape and arrangement of the various elements of the construction may be resorted to as come within the scope of the subjoined claims.

Having now described the invention so that others skilled in the art may clearly understand the same, what it is desired to secure by Letters Patent is as follows:

1. A hollow metal blade for a controllable-pitch propeller having an integral base end flange formed to provide an annular thrust bearing race on one side thereof and a closely adjacent blade turning gear sector, on the opposite side thereof, and a closure member for the base end of said blade carried by said blade and formed to provide a thrust bearing surface opposed to the thrust bearing surface on said flange.

2. In combination, a hollow metal propeller blade having an integral base end flange formed on one side to provide an annular thrust bearing race and formed on the opposite side to provide a blade turning gear sector, and a cup-shaped closure for the base end of said blade, said closure having a portion formed to provide a thrust bearing surface opposed to said race.

3. In combination with a metal propeller blade having a hollow base end and an integral base end flange formed on one side with an annular thrust bearing race and on the other side with an integral blade rotating gear element, means for closing the base end of said blade comprising, a cup shaped member receivable in said blade end with its open end substantially flush with the flanged end of said blade and the closed end thereof disposed within said hollow blade end, said closure member having a depth sufficient to receive propeller balancing weights therein.

ERLE MARTIN.